No. 854,736. PATENTED MAY 28, 1907.
J. W. HAMILTON.
HAY PRESS.
APPLICATION FILED OCT. 20, 1906.
2 SHEETS—SHEET 2.
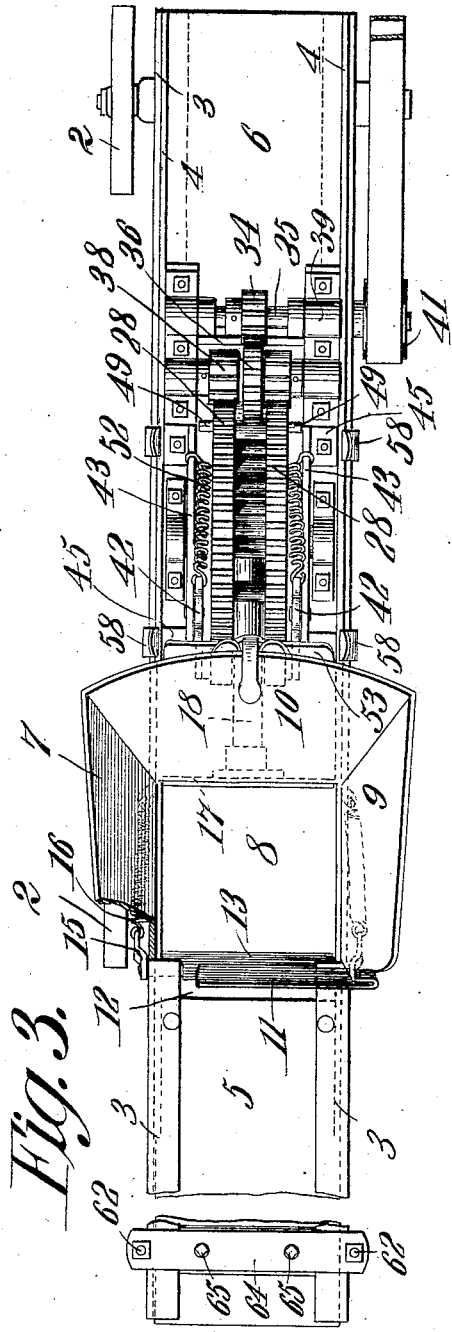
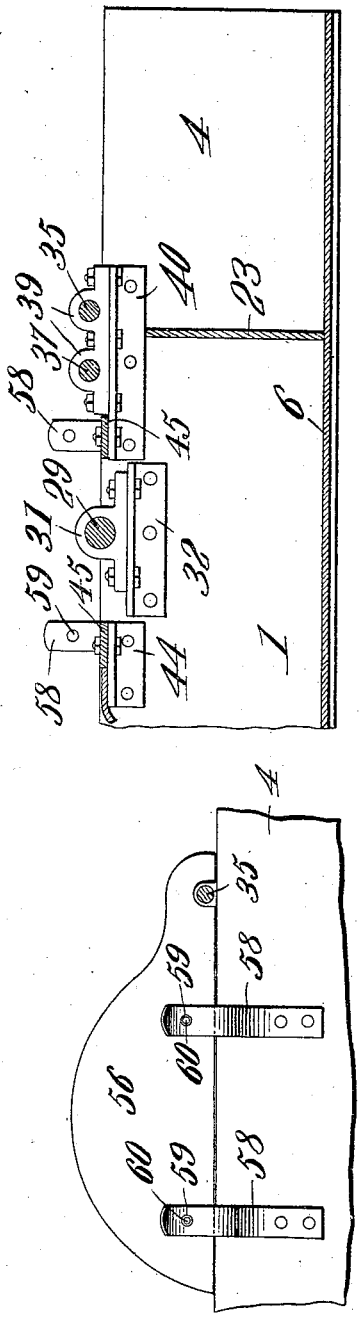
WITNESSES:
E. F. Stewart
C. Bradway
James W. Hamilton,
INVENTOR.
By C. A. Snow & Co.
ATTORNEYS
THE NORRIS PETERS CO., WASHINGTON, D. C.

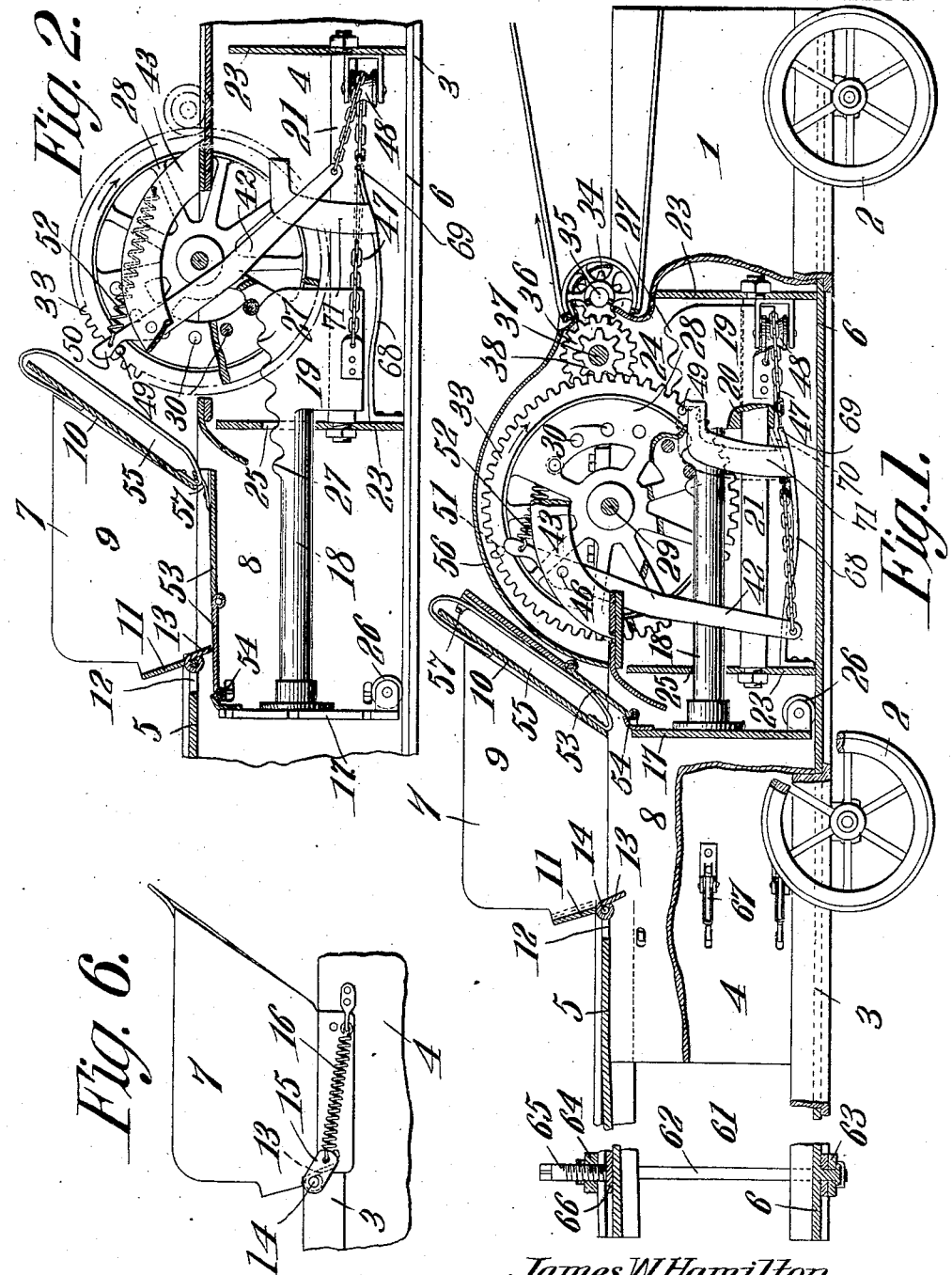

UNITED STATES PATENT OFFICE.

JAMES WILLIAM HAMILTON, OF WEATHERFORD, TEXAS.

HAY-PRESS.

No. 854,736.	Specification of Letters Patent.	Patented May 28, 1907.

Application filed October 20, 1906. Serial No. 339,828.

*To all whom it may concern:*

Be it known that I, JAMES WILLIAM HAMILTON, a citizen of the United States, residing at Weatherford, in the county of Parker and State of Texas, have invented a new and useful Hay-Press, of which the following is a specification.

The present invention relates to a baling press for pressing hay, or the like, for the purpose of baling, and relates more particularly to a press of that type having a reciprocating plunger passing back and forth under a feeding hopper that deposits the hay in front of the plunger preparatory to each forward stroke, whereby bales are successively formed in the pressing chamber and then expelled one at a time by a succeeding bale during the gradual forming thereof.

The invention has for one of its objects to provide a press of the character referred to having means for impelling the plunger forwardly and then disconnecting therefrom, and an independent means for quickly returning the plunger, so that an interval will be provided between the ending of the return stroke and the beginning of the succeeding forward stroke, for enabling the feeder to supply more hay to the press than would be possible if the forward and reverse strokes were of equal duration.

A further object of the invention is the provision of a mechanism for driving the plunger forward on the pressing stroke with a gradually increasing power to better compress the hay against the gradual increasing resistance offered by the latter during its compression.

A further object of the invention is to provide a closure for the throat of the hopper which is attached to the plunger so as to close the hopper during the pressing stroke and open it during the return stroke, so that the feeding device may supply hay continuously to the press.

Another object of the invention is to improve and simplify the construction and operation of apparatus of the nature referred to, so that bales can be expeditiously and compactly made with a minimum amount of power.

With these objects in view, and others, as will appear as the nature of the invention is better understood from the following description, the invention comprises various novel features of construction and arrangement of parts, which will be hereinafter set forth and defined with particularity in the claims appended hereto.

In the accompanying drawings, which illustrate one of the embodiments of the invention, Figure 1 is a side elevation of a press with parts broken away and in section for the purpose of displaying the operating mechanism. Fig. 2 is a longitudinal section of an intermediate portion of the machine showing the operating mechanism with the plunger in the extreme limit of its pressing stroke. Fig. 3 is a plan view of the press with the gear cover removed and an intermediate portion of the baling chamber cut away. Fig. 4 is a longitudinal sectional view taken on the line 4—4 of Fig. 3. Fig. 5 is a fragmentary side elevation of the machine, showing the gear cover and retainers therefor. Fig. 6 is a fragmentary side elevation of the machine showing the hopper and the yielding guard at the throat thereof.

Corresponding parts in the several figures are indicated throughout by similar characters of reference.

Referring to the drawings, 1 designates the frame of the press which is mounted upon road wheels 2 that are preferably permanently attached thereto so that the machine is always ready for travel from place to place, and mounting and dismounting the machine on its truck is avoided. The frame 1 comprises a long rectangular structure of square or rectangular cross section, and preferably composed of four longitudinal corner members extending the full length of the frame and made, preferably, of angle iron, and plates forming the sides, top and bottom. These longitudinal angle irons 3, which may each be made of one piece or in connected sections, are riveted, bolted, or otherwise suitably secured, to the plates 4, 5 and 6, forming, respectively, the side, top and bottom walls. One set of traction wheels 2 are located at the rear end of the frame 1, and the other set at a point about midway of the frame. The front end of the frame, which comprises the pressing and baling portion of the machine, is suspended free in the air, the weight of the driving mechanism located between the two sets of wheels and the rear end of the frame serving to counterbalance the weight of the front free end of the machine, so that ample stability is afforded. Two sets of road wheels are located a sufficient distance apart, so as to provide a large and stable supporting base.

Intermediate the ends of the frame 1 and located over the front set of wheels is a hopper 7 that discharges downwardly into the plunger chamber 8. The hopper 7 is provided with flaring side and rear walls 9 and 10, respectively, and a low front wall 11. As shown in Fig. 6, the side walls 9 are secured to the sides 4 of the frame 1, and the rear and front walls 10 and 11 are carried by the side walls 9. The top plate 5 of the frame 1 extends from the front end of the machine only to the hopper, as do also the top angle pieces 3. Between the rear end of the plate 5 and the front wall 11 of the hopper is formed a transverse slot or opening 12, Figs. 1 to 3, through which the usual division plates are inserted for separating the bales. At the lower edge of the wall 11 is mounted a yielding guard 13 that normally slopes in the same direction as the front wall and is rigidly secured to a shaft 14 that extends through the rear ends of the angle members 3, as shown in Fig. 6. On the ends of the shaft 14 are rigidly attached the crank arms 15, as shown in Figs. 3 and 6, and to the free ends of the crank arms are connected the front ends of approximately horizontally extending helical extension springs 16 that are anchored at their rear ends to the sides 4 of the frame 1. By this means, the guard 13 is permitted to swing forwardly to allow the hay that is caught between the same and the top edge of the piston to pass forwardly with the plunger and to prevent the hay from returning with the plunger on its rearward stroke.

The actuating mechanism for driving the plunger 17 forwardly is located to the rear of the hopper and between the two sets of road wheels and comprises the following parts:—
The plunger rod is rigidly connected at its front end to the plunger and at its rear end is provided with an enlargement or head 19 that has a longitudinally extending passage or bore 20. Extending through the bore 20 is a stationary guide bar on which the rear end of the plunger is supported throughout the length of its stroke. The guide bar 21 is preferably angular in cross section and the bore 20 is of corresponding shape, so that the plunger rod will be firmly held in its proper position. The ends of the guide bars are rigidly supported in transverse partitions 23 that serve as walls for inclosing the ends of the gear compartment 24. The piston rod is disposed above the guide bar and parallel thereto, and it works back and forth through an opening 25 in the front transverse partition 23. For supporting the plunger and front end of the plunger rod so as to operate with a minimum amount of friction, the plunger 17 is provided at its bottom edge with anti-friction rollers bearing on the bottom 6 of the frame 1. One of these rollers is indicated by 26, Figs. 1 and 2, and the rollers are disposed on the rear side of the plunger out of contact with the hay to be compressed. The plunger is driven forwardly by a mutilated gear engaging the rack teeth 27 formed on the top side of the plunger rod at the head end thereof. The mutilated gear is composed of two spaced wheels 28 mounted on a common horizontal shaft 29 and having arranged between them the pins 30 which serve as teeth for meshing with the teeth 27 of the piston rod rack. As shown in the plan view, Fig. 3, the plunger rod 18 lies in the central longitudinal plane, and the wheels 28 are disposed on opposite sides thereof. Sufficient pins 30 and teeth 27 are provided to drive the plunger the full length of its forward stroke, and after this point is reached, the gear disengages from the rack, separate means being provided for returning the plunger. In order to gradually increase the power as the pressing or forward stroke proceeds, the pins 30 toward the tail end of the mutilated gear are disposed nearer to the shaft 29 than those at the front end, and the teeth 27 are disposed on an incline, as shown in Figs. 1 and 2, so as to properly mesh with the pins. The shaft 29 of the mutilated gear is arranged on the same level with the top edges of the sides 4, as shown in Fig. 4, and is mounted in bearings 31 fixed on internal brackets 32 applied to the sides 4 of the frame 1. The peripheries of the wheels 28 are provided with gear teeth 33 which mesh with a train of speed reducing gears comprising a pinion 34, Figs. 1 and 3, keyed to the driving shaft 35, and meshing with a central gear 36 on the countershaft 37 that has keyed to it the pair of pinions 38 that mesh with the teeth 33 of the wheels 28. The shafts 35 and 37 are located at the rear of the shaft 29 and journaled in bearings 39 held on internal brackets 40. One end of the driving shaft 35 is prolonged beyond one side of the frame 1 and has keyed thereto the pulley 41 which is belted to any suitable source of power.

The device for returning the piston comprises a pair of levers 42 disposed at the sides of the wheels 28 and fulcrumed adjacent their upper ends on two arc-shaped plates 43, which plates are each secured at the rear end to the adjacent bracket 40 and at the front end to a bracket 44. The members 43 are segmental strips curved in the plane of their width and have their ends bent laterally to form feet whereby they are bolted to the brackets at 45. The fulcrum 46 of each lever is comparatively close to its upper end, so that the extremity of the lower arm would have a large range of movement for a relatively short arc of movement of the upper arm. The lower extremities of the levers are attached to the head 19 of the plunger rod by independent flexible elements, such as chains 47, that run rearwardly from the levers and pass around pulleys 48 and anchor to the head 19. The pulleys 48 are located on opposite sides of the guide bar 21 and are rigidly secured to the rear transverse partition 23. By this arrangement, the forward movement of the plunger causes the levers 42 to be shifted from the position shown in Fig. 1 to that shown in Fig. 2, so that the upper arms of the levers will be in the path of the pins 49 located one on each wheel 28. The pins 49 extend laterally from their respective wheels, as shown clearly in Fig. 3, and the upper arms of the levers 42 that are engaged by the pins are curved, as at 50, so that the pins can readily ride along and off the arms. As shown in Fig. 2, the location of the pins is such that the levers will be actuated by them as soon as the last pin 30 moves out of engagement with the last tooth 27 of the rack on the plunger rod. During the time the pins 49 move from the position shown in Fig. 2 to the dotted line position indicated by 51, Fig. 1, the levers will have been fully actuated and the plunger returned to its initial position. The wheels 28 continue to revolve and they pass through a considerable portion of a revolution before the first pin 30 is again brought into mesh with the rack of the plunger rod, so that, consequently, the plunger has a comparatively long idle period, so as to give the feeder device ample time to feed in a large quantity of hay.

In order to keep the chains 47 taut, each lever 42 is equipped with a helical extension spring 52 secured at their front ends to the upper arms of the levers, and at their rear ends to the arc-shaped plates 43. With a mechanism of the character described, it will be observed that the power received by the machine drives the gearing continuously to the end that the plunger is moved forwardly by a suitable means exerting an increasing power as the stroke proceeds and, after said means disconnects from the plunger, the plunger is returned quickly by an independent means, so that an idle period is produced before the first means is again brought into operation.

In order that a continuous feeding device may be employed in connection with the press, a closure for the throat of the hopper is provided so as to hold the hay while the plunger is moving on the pressing stroke, thus preventing hay from entering behind the plunger. This closure comprises hingedly connected plates 53 which are hinged at 54 to the top edge of the plunger 17, so as to move therewith. The end of the closure opposite the hinge 54 moves along the guide 55 disposed between the rear wall 10 of the hopper and the gear cover 56, as shown in Fig. 1. The guide 55 is composed of a strip of metal secured at its lower end to the wall 10 of the hopper and bent over the top edge of the said wall and held yieldingly against the front surface of the said wall by its own tension. By this means, the closure is guided from an inclined position back of the hopper to a horizontal position closing the throat of the hopper by the forward movement of the plunger, and vice versa, on the return stroke of the plunger. The free end of the closure is provided with a cleat 57 that forms an eye threaded on the guide 55. By having the upper end of the guide free and by hinging the two parts of the closure, ample flexibility is provided for permitting the closure to move without binding or buckling.

The gearing compartment 24 is closed on the top by the hood or cover 56. This cover is held in place by spring fingers 58, as shown in Figs. 3 to 5, which fingers are provided with apertures 59 with which pins 60 on the hopper engage. This cover coöperates with the sides and bottom of the frame 1 and with the transverse partitions 23 to completely inclose the mechanism for actuating the plunger. The space at the rear of the hind transverse partition 23 is left open and, if desired, may be used as a carrying receptacle.

The front end of the frame 1, which contains the pressing and baling chamber 61, may be left open at its sides, as shown in Fig. 1, so that the baling operation, that is to say, the placing of the wires, may be conveniently done through the open sides. Or, if desired, the sides 4 may continue to the front extremity of the frame and be provided with slots through which the baling wires are passed.

In order to create the proper resistance to the feed of the bail through the chamber 61, the top plate 5 of the frame is left free for the greater part of its length, so that it may be adjusted to converge the chamber 61 outwardly, or in the direction of discharge. The adjusting device comprises a pair of uprights 62 secured at their bottoms to a bottom cross plate 63 and carrying at their upper ends the cross plate 64, as shown clearly in Figs. 1 and 3. The cross plate 64 is provided with adjusting bolts 65 that screw up and down to adjust the plate 5. Intermediate the adjusting bolts and the said plate is a wearing member 66 secured to the plate 5. On the side walls 4 of the frame 1 and located vertically in line with the slot 12 through which the division plates are inserted are the catches 67 which may be of any approved construction for the purpose of preventing the rearward movement of the partition plates, as will be readily understood.

In order to lock the plunger in fixed position, during the idle period immediately preceding each compression stroke, a dog 68 is employed for engaging with the head 19 of the plunger rod. This dog, 68, Figs. 1 and 2, is in the nature of a spring secured at its front end on the transverse partition 23 and extending rearwardly under the guide bar 21. The spring is under a tension which urges the free end 69 thereof in an upward direction, and the spring is of such a length as to engage the front end of the head 19 when the plunger is at the extreme limit of its rearward stroke, as shown by dotted lines 70, Fig. 1. The spring dog 68 is provided with an upwardly extending wiping member or arm 71 that is disposed in the path of one of the pins 49 on the gear wheel 28, so that it can be engaged by the said pin and moved downwardly, for the purpose of disengaging the free end 69 of the spring from the plunger rod head 19. The parts are so arranged that the free end 69 of the dog is disengaged from the said head slightly before the time the pins 30 of the mutilated gear engage with the teeth 27 of the rack on the plunger rod. As the pin 49 rides over the arm 71, the spring dog is depressed and the plunger rod moved forwardly, and after the pin 49 moves off the arm, the spring dog flies upwardly to its normal position and its movement is stopped by coming in contact with the guide bar 21. On the return stroke of the plunger, the head 19 comes in contact with the free end of the dog and turns the dog aside to permit the head to pass. As soon as the head passes the dog, the latter snaps upwardly to the dotted line position, Fig. 1, thereby preventing the plunger from moving forwardly.

From the foregoing description, taken in connection with the accompanying drawings, the advantages of the construction and of the method of operation will be readily understood by those skilled in the art to which the invention appertains, and while I have described the principle of operation of the invention, together with the apparatus which I now consider to be the best embodiment thereof, I desire to have it understood that the apparatus shown is merely illustrative, and that various changes may be made, when desired, as are within the scope of the invention.

What is claimed is:—

1. The combination of a plunger, a rack connected therewith, a continuously rotating mutilated gear adapted to periodically mesh with the rack for driving the plunger forwardly, and a mechanism arranged to become operative simultaneously with the disengaging of the said gear from the rack for returning the plunger, said mechanism including a device carried by and rotating with the gear.

2. The combination of a plunger, a rack connected therewith, a gear wheel at one side of the rack, laterally extending pins on the wheel forming a mutilated gear adapted to periodically mesh with the rack for driving the plunger forwardly, means for driving the wheel and a quick acting mechanism for returning the plunger so as to introduce an idle period between each return stroke and the succeeding forward stroke, said mechanism comprising a lever fulcrumed at one side of the gear and arranged with one end flexibly connected with the plunger, a device on the gear wheel adapted to strike the opposite end of the lever, and means for returning the lever after being actuated by the said device.

3. The combination of a plunger, a rack and gear arranged to drive the plunger forwardly with a gradually increasing power, lever for returning the plunger, and means revolving with the gear and arranged to periodically strike the lever to actuate the same.

4. The combination of a plunger, a rack and gear arranged to drive the plunger forwardly with a gradually increasing power, and a quick acting mechanism for returning the plunger so as to introduce an idle period between each return and succeeding forward strokes, said mechanism comprising a device revolving with the gear, and means arranged in the path of the device and connected with the plunger.

5. The combination of a plunger, a rack and gear device for driving the plunger in one direction, and a mechanism for returning the plunger which includes means revolving with the gear.

6. The combination of a plunger, a rack connected therewith, a gear wheel, teeth thereon adapted to mesh with the rack for driving the plunger in one direction, a lever connected with the plunger for returning the latter, means on the gear wheel adapted to periodically engage the lever for actuating the same, and a mechanism for driving the gear wheel.

7. The combination of a plunger, a rack thereon, a mutilated gear arranged and adapted to periodically engage and disengage the rack for moving the latter forwardly, and a quick acting mechanism for returning the plunger, said mechanism comprising a lever connected with the plunger, and a means on the gear arranged to engage the lever simultaneously with the disengaging of the plunger by the gear for actuating the lever.

8. The combination of a plunger, a revoluble means arranged to engage with the plunger during a portion of its revolution for moving the latter forwardly, means connected with the plunger for returning it quickly, and a device rotating with and supported on said revoluble means for actuating the means immediately after the end of the forward stroke of the plunger.

9. The combination of a reciprocating element, means for driving the same in one direction, a lever having a long and short arm, a flexible member between the long arm and the element, a revoluble means adapted to engage the short arm of the lever at the end of the forward stroke of the element for returning the latter quickly, and a spring connected with the short arm of the lever for returning the latter to its initial position after being actuated by said means.

10. The combination of a reciprocating element, a rack and gear of the mutilated type for driving the element forwardly, and a quick acting mechanism for returning the element, said mechanism comprising a member flexibly connected with the element, and a device revolving with the gear for actuating the member.

11. The combination of a reciprocating element, a rack connected with the element, a mutilated gear arranged to mesh with the rack, a revolving wheel carrying the gear, and a mechanism for actuating the element in a direction opposite from that due to the said gear, said mechanism comprising a lever, a connection between the lever and element, and a device on the wheel having a wiping engagement with one end of the lever for actuating the latter.

12. The combination of a reciprocating element, a rack connected with the element, a mutilated gear arranged to mesh with the rack, a revolving wheel carrying the gear, and a mechanism for actuating the element in a direction opposite from that due to the said gear, said mechanism comprising a lever, a flexible element connecting the lever with the element, a pulley for the flexible element, and a device on the wheel which periodically engages the lever for imparting motion thereto.

13. The combination of a reciprocating element, means for driving the element in one direction only, and a mechanism for driving the element in the opposite direction and at such a rate as to introduce an idle period before the said means operates on the plunger, and means for locking the element during its idle period, said mechanism comprising a lever fulcrumed to have a short and a long arm, a flexible member connecting the long arm of the lever with the element, and a revolving device arranged to engage the short arm of the lever simultaneously with the ending of the stroke of the element due to the said means for actuating the lever to return the element quickly.

14. The combination of a reciprocating element, with a mechanism for driving the same in one direction, said mechanism comprising a pair of levers disposed on opposite sides of the element, a flexible member between each lever and the element, and a revolving device arranged between the lever and having a laterally projecting member on each side to actuate the levers simultaneously.

15. The combination of a reciprocating element, means for actuating the same in one direction, a mechanism for driving the element in the opposite direction, and a device for automatically locking the element during a limited period between its strokes said mechanism comprising a pair of levers disposed on opposite sides of the element and each having a long and a short arm, flexible members connecting the long arms of the levers with the element, pulleys over which the members run, and a revolving device arranged to periodically engage the short arms of the levers for actuating the element quickly.

16. The combination of a reciprocating element, a gear rotating on a horizontal axis for actuating the same in one direction, and a mechanism for driving the element in the opposite direction, said mechanism comprising a pair of levers disposed on opposite sides of the element and gear and each having a long and a short arm, flexible members connecting the long arm of the levers with the element, pulleys over which the members run, and devices on opposite sides of the gear arranged to periodically and simultaneously actuate the levers.

17. The combination of a reciprocating element, means for actuating the same, said means comprising a lever, a flexible member connecting the lever with the element, a pulley for the member, and a yielding means for permanently holding the said member taut.

18. The combination of a reciprocating element, a mutilated rack and pinion device for moving the element in one direction, a revolving wheel carrying the pinion of said device, a mechanism for actuating the element in the opposite direction, and a pin on the wheel for periodically operating the said mechanism.

19. The combination of a pair of spaced gear wheels, teeth between them forming a mutilated gear, a reciprocating element, a rack connected with the element and disposed between the wheels to mesh with the teeth, and a mechanism actuated by the said wheels for returning the element immediately after the latter has been actuated by the gear and rack.

20. The combination of a pair of spaced gear wheels, teeth between them forming a mutilated gear, a reciprocating element, a rack connected with the element and disposed between the wheels to mesh with the teeth, supports on opposite sides of the said wheels, levers fulcrumed thereon, flexible members between the levers and element, springs between the levers and said supports for maintaining the flexible members taut, and means on the wheels for actuating the levers.

21. The combination of a wheel, means carried thereby which form a mutilated gear, a reciprocating element, a rack connected with the element which meshes with the gear for driving the element in one direction, a mechanism for actuating the element in the opposite direction, a device carried by the said wheel for operating the mechanism, and a gearing for driving the wheel.

22. The combination of a supporting frame having transverse walls, a guide bar supported by the walls, a plunger rod, a head on the rod having a bore through which the guide bar extends, means engaging the plunger rod for driving it in one direction, and a mechanism for driving the rod in the opposite direction, said mechanism comprising a flexible element connected with the rod, and a pulley for guiding the movement of the element.

23. The combination of a supporting frame provided with a compartment, a horizontal guide bar supported therein, a horizontal reciprocating plunger rod guided along said bar, a mechanism within the compartment for driving the plunger forwardly, a second mechanism in the compartment for driving the plunger rod in the opposite direction, and a continuously rotating common driving gearing for automatically actuating the mechanism alternately.

24. The combination of a supporting frame having a pressing chamber, a hopper leading into the same, a plunger moving back and forth in said chamber, a closure connected thereto a yielding guard at the front end of the hopper, and springs exterior to the hopper and connected with the ends of the guard.

25. In a press, the combination of a plunger, means for reciprocating the plunger with an idle period intermediate each return and succeeding forward stroke, and an automatically actuated means for locking the plunger in fixed position during its idle period.

26. In a press, the combination of a plunger, means for reciprocating the plunger with an idle period intermediate each return and succeeding forward stroke, a spring dog for holding the plunger in fixed position during its idle period, and means for releasing the dog preparatory to the forward stroke.

27. In a press, the combination of a plunger, a continuously rotating device, means on the device for driving the plunger forwardly, means actuated by the device for returning the plunger quickly, and a dog controlled by the device for holding the plunger stationary between each return and succeeding forward stroke.

28. In a press, the combination of a plunger, a rotatable device for actuating the plunger, a pin on the device, a dog for holding the plunger stationary, means on the dog engaged by the said pin for rendering the dog inoperative, and means arranged to guide the movement of the plunger and to act as a stop for limiting the movement of the dog.

In testimony that I claim the foregoing as my own, I have hereto affixed my signature in the presence of two witnesses.

JAMES WILLIAM HAMILTON.

Witnesses:
S. B. SMITH,
J. O. MYERS.